(12) United States Patent
Wu et al.

(10) Patent No.: US 10,557,982 B2
(45) Date of Patent: Feb. 11, 2020

(54) DIE CORE FOR LIGHT GUIDE PLATE, MANUFACTURING METHOD THEREOF, AND LIGHT GUIDE PLATE

(71) Applicants: BOE TECHNOLOGY GROUP CO., LTD., Beijing (CN); HEFEI BOE DISPLAY LIGHTING CO., LTD., Anhui (CN)

(72) Inventors: Bo Wu, Beijing (CN); Zuchuan Shi, Beijing (CN)

(73) Assignees: BOE TECHNOLOGY GROUP CO., LTD., Beijing (CN); HEFEI BOE DISPLAY LIGHTING CO., LTD., Hefei, Anhui (CN)

( * ) Notice: Subject to any disclaimer, the term of this patent is extended or adjusted under 35 U.S.C. 154(b) by 0 days.

(21) Appl. No.: 16/000,343

(22) Filed: Jun. 5, 2018

(65) Prior Publication Data

US 2019/0079238 A1    Mar. 14, 2019

(30) Foreign Application Priority Data

Sep. 11, 2017   (CN) .......................... 2017 1 0812555

(51) Int. Cl.
*F21V 8/00* (2006.01)
*G02F 1/1335* (2006.01)
*B29D 11/00* (2006.01)
*G02F 1/13357* (2006.01)

(52) U.S. Cl.
CPC ...... *G02B 6/0031* (2013.01); *B29D 11/00663* (2013.01); *G02B 6/0016* (2013.01); *G02B 6/0028* (2013.01); *G02F 1/1336* (2013.01)

(58) Field of Classification Search
CPC .. G02B 6/0016; G02B 6/0031; G02B 6/0028; G02B 6/0065; G02B 6/0043; G02F 1/1336; B29D 11/00663; C25D 7/00; B29C 33/42
See application file for complete search history.

(56) References Cited

U.S. PATENT DOCUMENTS

| 2002/0036356 | A1* | 3/2002 | Teshima | H01L 21/2885 257/797 |
| 2003/0160911 | A1 | 8/2003 | Kano | |
| 2005/0142499 | A1* | 6/2005 | Chen | B82Y 20/00 430/321 |

(Continued)

FOREIGN PATENT DOCUMENTS

| CN | 1441298 A | 9/2003 |
| CN | 1696782 A | 11/2005 |
| CN | 101034183 A | 9/2007 |

(Continued)

OTHER PUBLICATIONS

First Office Action for Chinese Application No. 201710812555.X, dated Mar. 1, 2019, 7 Pages.

*Primary Examiner* — Tracie Y Green
(74) *Attorney, Agent, or Firm* — Brooks Kushman P.C.

(57) ABSTRACT

The present disclosure provides a die core for a light guide plate, a manufacturing method thereof, and the light guide plate. The manufacturing method includes steps of: providing a body, a to-be-processed surface of the body including a dot formation region and a dot-free region; forming dots at the dot formation region, the dots including protrusions and recesses; and forming a coverage layer at least covering the protrusions.

7 Claims, 4 Drawing Sheets

(56) References Cited

U.S. PATENT DOCUMENTS

2016/0158514 A1\* 6/2016 Stoeber ............. A61M 37/0015
427/2.28
2016/0245985 A1\* 8/2016 Zheng .............. B29D 11/00663

FOREIGN PATENT DOCUMENTS

| CN | 101161400 A | 4/2008 |
| CN | 101825260 B | 5/2012 |
| CN | 104570190 A | 4/2015 |

\* cited by examiner

DIE CORE FOR LIGHT GUIDE PLATE, MANUFACTURING METHOD THEREOF, AND LIGHT GUIDE PLATE

CROSS-REFERENCE TO RELATED APPLICATION

This application claims priority to Chinese Patent Application No. 201710812555.X filed on Sep. 11, 2017, which is incorporated herein by reference in its entirety.

TECHNICAL FIELD

The present disclosure relates to the field of display technology, in particular to a die core for a light guide plate, a manufacturing method thereof, and the light guide plate.

BACKGROUND

Along with the development of the display technology, liquid crystal display devices have been widely used. Due to the absence of a light-emitting function, it is necessary to provide a backlight module for the liquid crystal display device, so as to provide an even area light source, thereby to enable the liquid crystal display device to display an image.

Usually, the backlight module includes a light source, a light guide plate, a reflector, a prism, and a diffuser. The light guide plate is a principal element for converting a linear light source or a point light source into the even area light source. To be specific, dots are arranged at a reflection surface of the light guide plate. Due to a scattering function of the dots, a total reflection effect of a light beam inside the light guide plate may be prevent, thereby the light beam from the linear light source or the point light source may be guided toward a light-exiting surface of the light guide plate and evenly exit therefrom. In this way, it is able to convert the linear light source or the point light source into the even area light source, and improve brightness and uniformity of the area light source in a better manner. However, in the case that a conventional die core is adopted, it is merely able for the dots of the resultant light guide plate to scatter the light beam at a relatively small scattering angle, thereby a light utilization rate of the light guide plate is relatively low.

SUMMARY

In one aspect, the present disclosure provides in some embodiments a method for manufacturing a die core for a light guide plate, including: providing a body, a to-be-processed surface of the body including a dot formation region and a dot-free region; forming dots at the dot formation region, the dots including protrusions and recesses; and forming a coverage layer at least covering the protrusions.

In a possible embodiment of the present disclosure, the step of forming the coverage layer at least covering the protrusions includes forming the coverage layer covering all the dots.

In a possible embodiment of the present disclosure, prior to the step of forming the dots at the dot formation region, the method further includes forming a sacrificial layer covering the entire to-be-processed surface. The step of forming the dots at the dot formation region includes forming the dots at the dot formation region through a dot machining device, and removing the sacrificial layer on the dots. The step of forming the coverage layer at least covering the protrusions includes forming the coverage layer at least covering the protrusions through an electroplating process. Subsequent to the step of forming the coverage layer at least covering the protrusions, the method further includes removing the sacrificial layer at the dot-free region.

In a possible embodiment of the present disclosure, the step of forming the coverage layer at least covering the protrusions through an electroplating process includes: placing the body with the dots and an electroplating target into a tank containing an electroplating liquid; enabling the body to be connected to a negative pole of a direct current source, enabling the electroplating target to be connected to a positive pole of the direct current source, and applying an electric signal to the body and the electroplating target through the direct current source; and enabling metal cations in the electroplating liquid to be deposited onto the dots on the body under the effect of the electric signal, so as to form the coverage layer at least covering the protrusions.

In another aspect, the present disclosure provides in some embodiments a die core for a light guide plate, including a body and dots formed on a to-be-processed surface of the body. The dots include protrusions and recesses. The die core further includes a coverage layer at least covering the protrusions.

In a possible embodiment of the present disclosure, the coverage layer covers all the dots.

In a possible embodiment of the present disclosure, the coverage layer is an electroplating layer.

In a possible embodiment of the present disclosure, the coverage layer has a thickness of 1 μm to 3 μm, a plane tangent to an outer wall of the coverage layer covering the protrusions is angled relative to a plane parallel to the to-be-processed surface at an angle of 75° to 80°.

In yet another aspect, the present disclosure provides in some embodiments a light guide plate manufactured through the above-mentioned die core. The light guide plate includes a body and dots arranged at a reflection surface of the body. The dots include protrusions and recesses. Each protrusion has a height smaller than a depth of the recess.

In a possible embodiment of the present disclosure, the height of each protrusion is within the range of 1.5 μm to 2.0 μm, the depth of each recess is within the range of 1.8 μm to 2.2 μm, and a plane tangent to an outer wall of the recess is angled relative to a plane parallel to the reflection surface at an angle of 75° to 80°.

BRIEF DESCRIPTION OF THE DRAWINGS

The following drawings are provided to facilitate the understanding of the present disclosure, and constitute a portion of the description. These drawings and the following embodiments are for illustrative purposes only, but shall not be construed as limiting the present disclosure. In these drawings.

DETAILED DESCRIPTION

In order to make the objects, the technical solutions and the advantages of the present disclosure more apparent, the present disclosure will be described hereinafter in a clear and complete manner in conjunction with the drawings and embodiments. Obviously, the following embodiments merely relate to a part of, rather than all of, the embodiments of the present disclosure, and based on these embodiments, a person skilled in the art may, without any creative effort, obtain the other embodiments, which also fall within the scope of the present disclosure.

Unless otherwise defined, any technical or scientific term used herein shall have the common meaning understood by a person of ordinary skills. Such words as "first" and "second" used in the specification and claims are merely used to differentiate different components rather than to represent any order, number or importance. Similarly, such words as "one" or "one of" are merely used to represent the existence of at least one member, rather than to limit the number thereof. Such words as "connect" or "connected to" may include electrical connection, direct or indirect, rather than to be limited to physical or mechanical connection. Such words as "on", "under", "left" and "right" are merely used to represent relative position relationship, and when an absolute position of the object is changed, the relative position relationship will be changed too.

Figure 1:
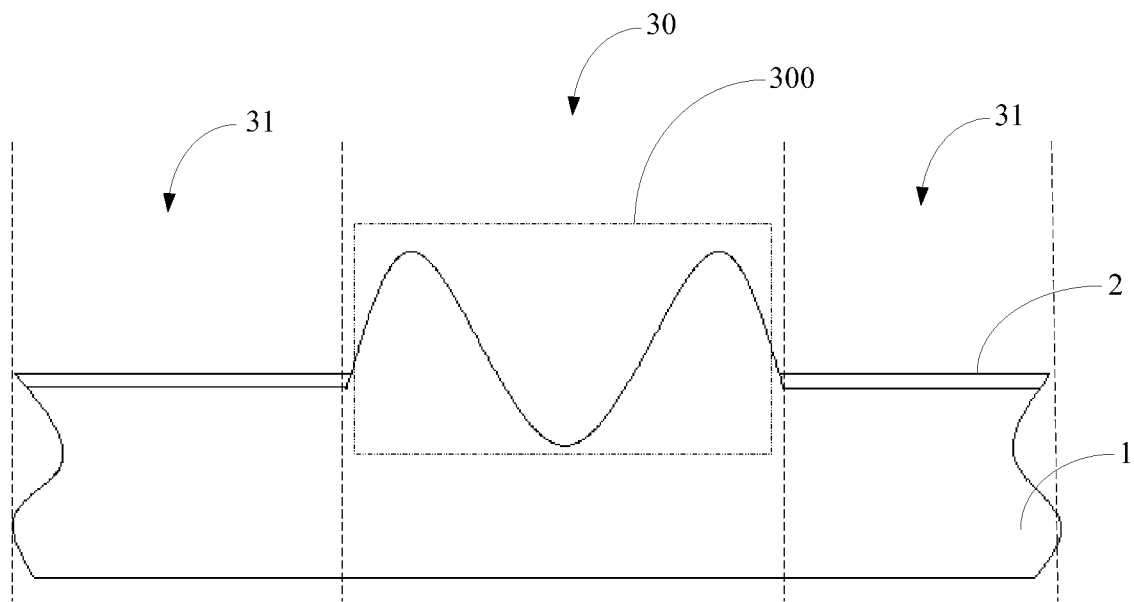
FIG. 1 is a schematic view showing the formation of a die core for a light guide plate according to one embodiment of the present disclosure.
Figure 2:
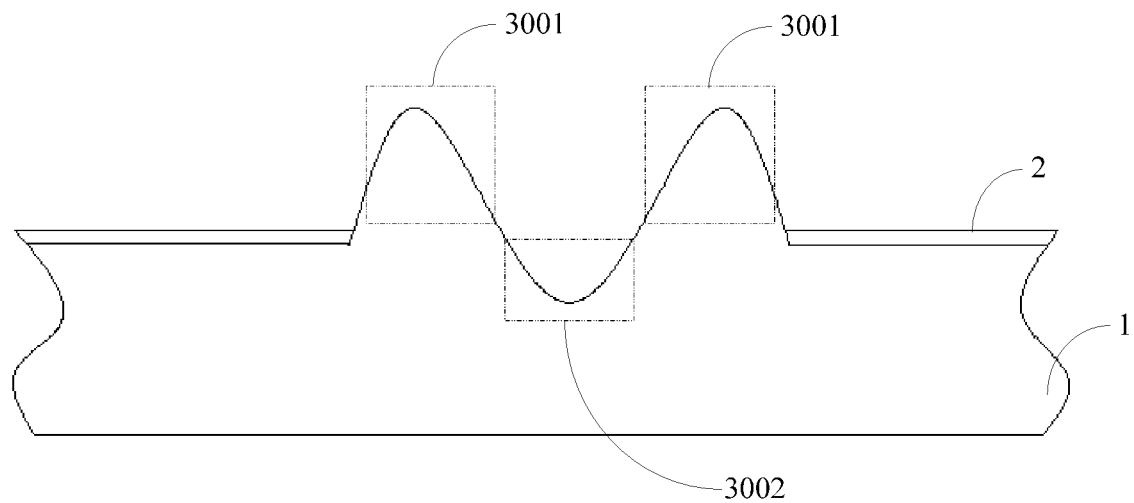
FIG. 2 is another schematic view showing the formation of the die core according to one embodiment of the present disclosure.
Figure 3:
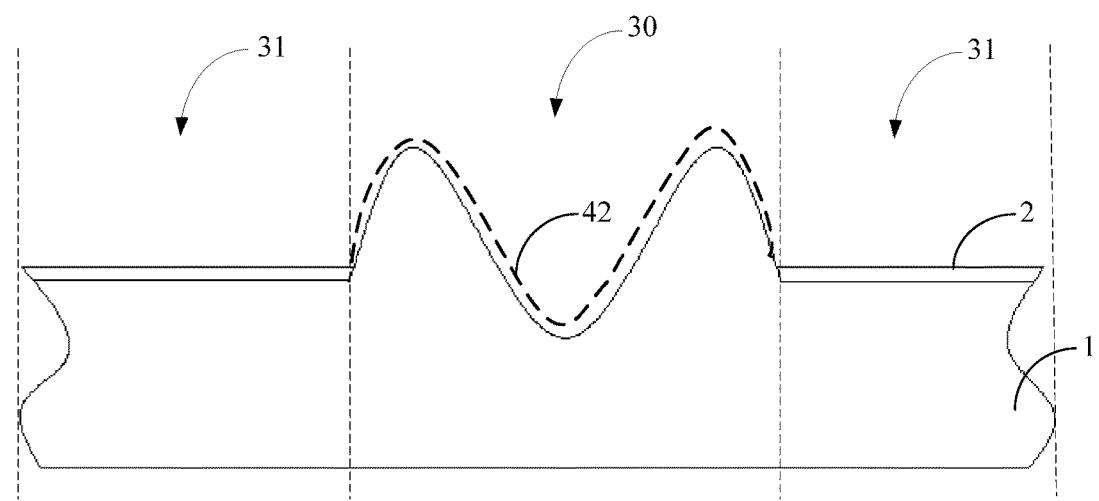
FIG. 3 is yet another schematic view showing the formation of the die core according to one embodiment of the present disclosure.

Referring to FIGS. 1 to 3, the present disclosure provides in some embodiments a method for manufacturing a die core for a light guide plate, which includes the following steps.

Step S101: providing a body 1, a to-be-processed surface of the body 1 including a dot formation region 30 and a dot-free region 31.

To be specific, a size of the die core depends on a size of the body 1, and a size of the resultant light guide plate depends on the size of the die core. The body 1 may be selected in accordance with the size of the light guide plate to be manufactured subsequently, so as to enable the die core including the body 1 to meet the practical need. It should be appreciated that, a relatively large body 1 may be selected and manufactured into a mother board for the die core. In this way, it is able to manufacture a mother board for the light guide plate using the mother board for the die core, thereby to improve the tact time.

Step S102: forming dots 300 at the dot formation region 30, the dots 300 including protrusions 3001 and recesses 3002.

Figure 10:
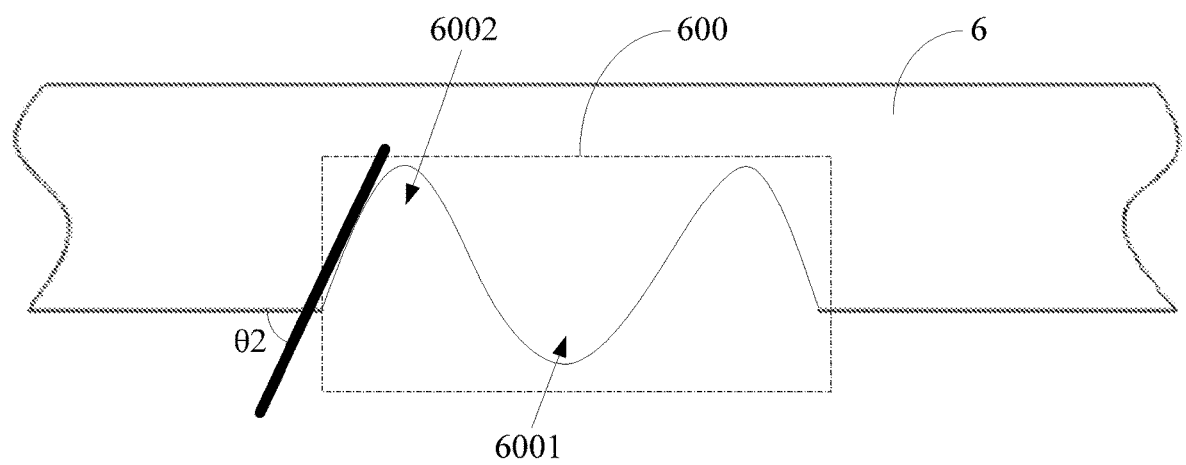
FIG. 10 is a schematic view showing the light guide plate according to one embodiment of the present disclosure.

More specifically, the to-be-processed surface of the body 1 acquired in Step S101 includes the dot formation region 30 and the dot-free region 31. In Step S102, the dots 300 are formed at the dot formation region 30, and the dots 300 include the protrusions 3001 and the recesses 3002. In the case that the light guide plate is formed using the die core, as shown in FIG. 10, the dots 300 at the dot formation region 30 correspond to dots 600 of the resultant light guide plate, a height of each protrusion 3001 corresponds to a depth of each recess 6002 of the light guide plate, and a depth of each recess 3002 corresponds to a height of each protrusion 6001 of the light guide plate.

Step S103: forming a coverage layer 42 at least covering the protrusions 3001.

For the dots formed using a conventional method, the height of the protrusion is substantially identical to the depth of the recess, so the height of the protrusion of the resultant light guide plate is substantially identical to the depth of the recess of the resultant light guide plate. In order to change the height of the protrusion 6001 and the depth of the recess 6002 of the light guide plate, the coverage layer 42 may be formed on the dots 300 in such a manner as to at least cover the protrusions 3001. In this way, the recess 6002 of the light guide plate corresponding to the protrusion 3001 may have a larger depth, so as to guide a light beam inside the light guide plate in a better manner.

According to the method for manufacturing the die core for the light guide plate in the embodiments of the present disclosure, the dots 300 are formed at the dot formation region 30 of the to-be-processed surface of the body 1, and these dots include the protrusions 3001 and the recesses 3002. Then, the coverage layer 42 is formed in such a manner as to at least cover the protrusions 3001, i.e., the height of each protrusion 3001 increases. In this way, it is able to provide each recess 6002 of the resultant light guide plate corresponding to the protrusion 3001 with a larger depth, thereby to increase an angle θ2 between a plane tangent to an outer wall of the recess 6002 and a plane parallel to a reflection surface of the light guide plate. In the case that the angle θ2 increases, it is able to increase a scattering angle of the dots of the light guide plate, improve a convergence property, enable the recess 6002 to guide the light beam to exit from a light-exiting surface of the light guide plate in a better manner, and reduce the possibility of total reflection of the light beam at the light-exiting surface, thereby to improve the light utilization. In addition, in the case that the scattering angle of the dot of the light guide plate increase, it is also able for the light beam entering the dot to exit from the light guide plate in a direction substantially perpendicular to the light-exiting surface of the light guide plate, thereby to increase the light energy of the light beam from the light guide plate.

In order to further increase the light utilization, in a possible embodiment of the present disclosure, Step S103 of forming the coverage layer 42 at least covering the protrusions 3001 may include forming the coverage layer 42 covering all the dots 300.

Through the coverage layer 42 covering all the dots 300, it is able to not only increase the height of each protrusion 3001 relative to a plane where the to-be-processed surface is located, but also reduce the depth of each recess 3002 relative to the plate where the to-be-processed surface is located. At this time, the recess 6002 of the resultant light guide plate corresponding to the protrusion 3001 may be provided with a larger depth, and the protrusion 6001 of the resultant light guide plate corresponding to the recess 3002 may be provided with a smaller height. In this way, it is able for the resultant light guide plate to guide the light beam through the recess 6002 in a better manner, thereby to improve the light utilization. In addition, in the case that a reflector is attached onto the reflection surface of the light guide plate, it is able to reduce a gap between the light guide plate and the reflector, and reduce the light loss in the gap, thereby to further improve the light utilization.

Prior to Step S102 of forming the dots 300 at the dot formation region 30, the method further includes forming a sacrificial layer 2 covering the entire to-be-processed surface.

Figure 4:
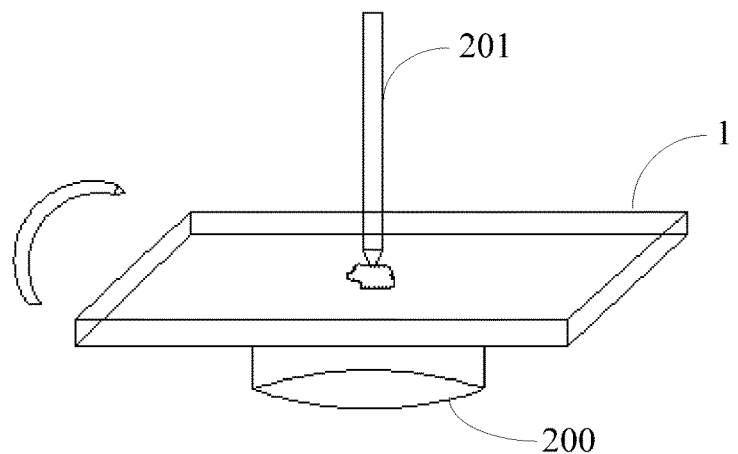
FIG. 4 is a schematic view showing the formation of a sacrificial layer on a body of the die core according to one embodiment of the present disclosure.
Figure 5:
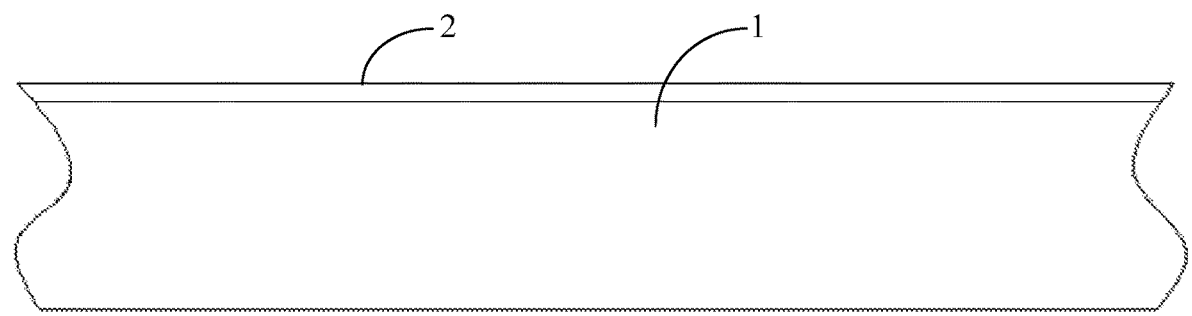
FIG. 5 is another schematic view showing formation of the sacrificial layer on the body of the die core according to one embodiment of the present disclosure.

To be specific, the sacrificial layer 2 may be formed on the to-be-processed surface of the body 1 in various ways, e.g., through spinning. In the case that the sacrificial layer 2 is to be formed through spinning, as shown in FIGS. 4 and 5, the body 1 may be installed onto a rotary platform 200 of a spinning machine with the to-be-processed surface facing upward. Next, an organic solution for forming the sacrificial layer 2 may be dropped onto the to-be-processed surface through a dripping device 201. Then, the rotary platform 200 may drive the body 1 to rotate, so as to enable the organic solution to form the sacrificial layer 2 on the to-be-processed surface. It should be appreciated that, the organic solution may be, but not limited to, a polyurethane solution.

Step S102 of forming the dots 300 at the dot formation region 30 may include forming the dots 300 at the dot formation region 30 through a dot machining device 301, and removing the sacrificial layer 2 on the dots 300.

Figure 6:
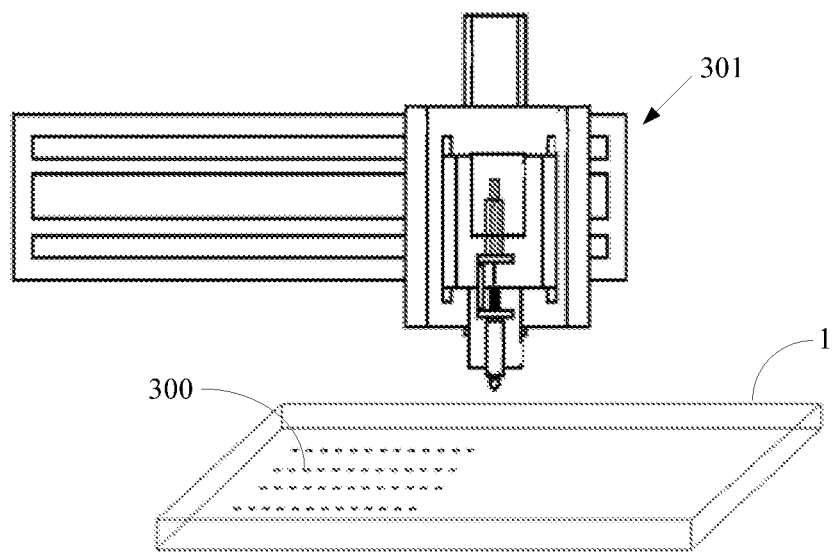
FIG. 6 is a schematic view showing the formation of dots according to one embodiment of the present disclosure.

More specifically, as shown in FIG. 6, after the formation of the sacrificial layer 2 covering the entire to-be-processed surface, the dots 300 may be formed at the dot formation region 30 through the dot machining device 301, e.g., a laser. Due to the relatively high energy generated by the laser, it is able to directly form the recesses 3002 in the body 1 by melting a portion of the body 1 at the dot formation region, and meanwhile form the protrusions 3001 using a melted material acquired in the case of forming the recesses 3002. In addition, the sacrificial layer 2 is made of an organic material having a relatively low melting point. In the case that the dots 300 are formed using the laser, the sacrificial layer 2 at the dot formation region 30 may be volatilized rapidly, so it is able to prevent the machining of the dots 300 from being adversely affected by the sacrificial layer 2 at the dot formation region 30.

Step S103 of forming the coverage layer 42 at least covering the protrusions 3001 may include forming the coverage layer 42 at least covering the protrusions 3001 through an electroplating process.

Figure 7:
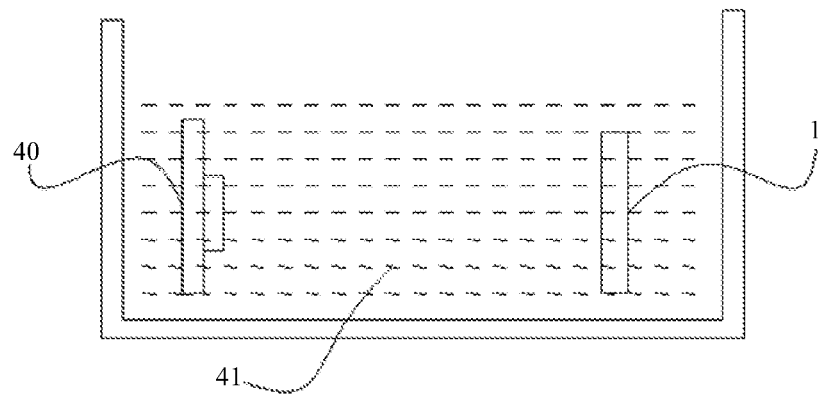
FIG. 7 is a schematic view showing the formation of an electroplating layer on the dots according to one embodiment of the present disclosure.

As shown in FIG. 7, the step of forming the coverage layer covering at least covering the protrusions through an electroplating process includes the following steps.

Step S1031: placing the body 1 with the dots 300 and an electroplating target 40 into a tank containing an electroplating liquid 41. The electroplating liquid 41 may be a nickelous amide solution. The electroplating target 40 may be a metal material, e.g., silver or copper.

Step S1032: enabling the body 1 to be connected to a negative pole of a direct current source, enabling the electroplating target 40 to be connected to a positive pole of the direct current source, and applying an electric signal to the body 1 and the electroplating target 40 through the direct current source. To be specific, the body 1 is connected to the negative pole of the direct current source and serves as a cathode, while the electroplating target 40 is connected to the positive pole of the direct current source and serves as an anode.

Step S1033: enabling metal cations in the electroplating liquid 41 to be deposited onto the dots 300 on the body 1 under the effect of the electric signal, so as to form the coverage layer at least covering the protrusions. To be specific, after the electric signal has been applied to the body 1 and the electroplating target 40 through the direct current source, the metal cations in the electroplating liquid 41 may acquire electrons from the body 1 as the cathode, and then deposited onto a surface of each dot 300 so as to form an electroplating layer. In addition, atoms in the electroplating target 40 as the anode may lose their electrons to form the metal cations and then added into the electroplating liquid 41 continuously, so as to maintain a concentration of the metal cations in the electroplating liquid 41.

It should be appreciated that, during the electroplating process, the electroplating layer with a smooth surface may be formed on the dots 300, and a thickness of the electroplating layer may be adjusted in accordance with the practical need. In addition, during the electroplating process, due to the sacrificial layer 2 covering the dot-free region, the body 1 at the dot-free region may be separated from the electroplating liquid 41, so it is impossible for the metal cations in the electroplating liquid 41 to acquire electrons from the body 1 at the dot-free region. Hence, the electroplating layer is merely formed on the dots 300 rather than at the dot-free region.

After the formation of the coverage layer 42 at least covering the protrusions 3001, the method may further include removing the sacrificial layer 2 at the dot-free region of the body 1.

Figure 8:
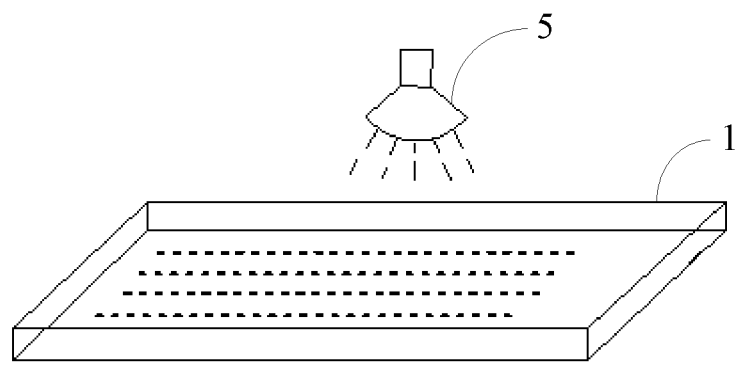
FIG. 8 is a schematic view showing the removal of the sacrificial layer at a dot-free region according to one embodiment of the present disclosure.

To be specific, as shown in FIG. 8, the sacrificial layer 2 at the dot-free region 31 may be removed in various ways, e.g., through a mechanical removing process or a rinsing process. In the case that the sacrificial layer 2 is removed through the rinsing process, in a possible embodiment of the present disclosure, an acetone solvent may be sprayed onto the electroplated surface of the body 1 through a rinsing unit 5, so as to remove the sacrificial layer 2. The die core may be acquired after the removal of the sacrificial layer 2 at the dot-free region.

Figure 9:
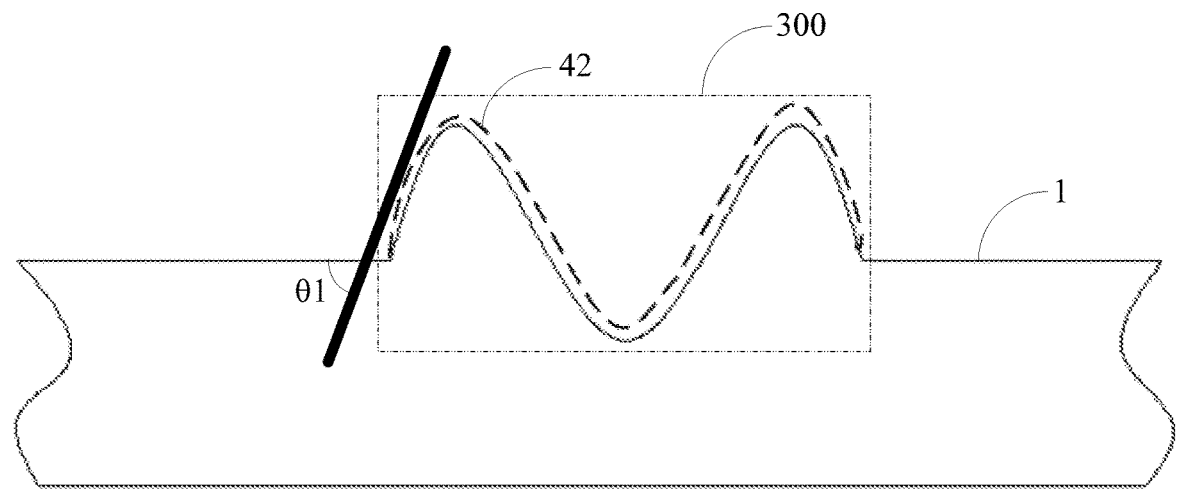
FIG. 9 is a schematic view showing the die core according to one embodiment of the present disclosure.

As shown in FIG. 9, the present disclosure further provides in some embodiments a die core for a light guide plate, which includes a body 1 and dots 300 formed on a to-be-processed surface of the body 1. The dots 300 include protrusions 3001 and recesses 3002. The die core further includes a coverage layer 42 at least covering the protrusions 3001.

As shown in FIG. 10, in the case that the light guide plate is formed using the above-mentioned die core, dots 600 are formed at a reflection surface of the light guide plate. The dots 600 include protrusions 6001 corresponding to the recesses 3002 of the die core and recesses 6002 corresponding to the protrusions 3001 of the die core.

According to the embodiments of the present disclosure, the die core includes the body 1 and the dots 300 arranged on the to-be-processed surface of the body 1. The dots 300 include the protrusions 3001 and the recesses 3002. The die core further includes the coverage layer 42 at least covering the protrusions 3001. Due to the coverage layer 42, the height of each protrusion 3001 may increase. In this way, it is able to provide each recess 6002 of the resultant light guide plate corresponding to the protrusion 3001 with a larger depth, thereby to increase an angle θ2 between a plane tangent to an outer wall of the recess 6002 and a plane parallel to the reflection surface of the light guide plate. In the case that the angle θ2 increases, it is able to increase a scattering angle of the dots of the light guide plate, improve a convergence property, enable the recess 6002 to guide the light beam to exit from a light-exiting surface of the light guide plate in a better manner, and reduce the possibility of total reflection of the light beam at the light-exiting surface, thereby to improve the light utilization. In addition, in the case that the scattering angle of the dot of the light guide plate increase, it is also able for the light beam entering the dot to exit from the light guide plate in a direction substantially perpendicular to the light-exiting surface of the light guide plate, thereby to increase the light energy of the light beam from the light guide plate.

In a possible embodiment of the present disclosure, the coverage layer 42 may cover all the dots 300.

Through the coverage layer 42 covering all the dots 300, it is able to not only increase the height of each protrusion 3001 relative to a plane where the to-be-processed surface is located, but also reduce the depth of each recess 3002 relative to the plate where the to-be-processed surface is located. At this time, the recess 6002 of the resultant light guide plate corresponding to the protrusion 3001 may be provided with a larger depth, and the protrusion 6001 of the resultant light guide plate corresponding to the recess 3002 may be provided with a smaller height. In this way, it is able for the resultant light guide plate to guide the light beam through the recess 6002 in a better manner. In addition, in the case that a reflector is attached onto the reflection surface of the light guide plate, it is able to reduce a gap between the light guide plate and the reflector, and reduce the light loss in the gap, thereby to further improve the light utilization.

It should be appreciated that, the coverage layer 42 may be of different types, e.g., an electroplating layer. In the case that the coverage layer 42 is the electroplating layer, it may be directly formed on the dots 300 through a conventional electroplating process, so the formation of the electroplating layer is relatively simple. In addition, the resultant electroplating layer has a smooth surface, and a thickness of the electroplating layer may be adjusted easily. The formation of the electroplating layer may refer to that mentioned above, and thus will not be particularly defined herein.

In addition, a thickness of the coverage layer 42 and an angle θ1 between a plane tangent to the outer wall of the coverage layer 42 covering the protrusions 3001 and a plane parallel to the to-be-processed surface may be set in accordance with the practical need. In a possible embodiment of the present disclosure, the coverage layer 42 has a thickness of 1 μm to 3 μm. The angle θ1 between the plane tangent to the outer wall of the coverage layer 42 covering the protrusions 3001 and the plane parallel to the to-be-processed surface may be within the range of 75° to 80°. In the case that the light guide plate is manufactured using the die core, it is able to provide each protrusion 6001 of the light guide plate with an appropriate height and provide each recess 6002 of the light guide plate with an appropriate depth, thereby to enable the angle θ2 between the plane tangent to the outer wall of the recess 6002 and the plane parallel to the reflection surface of the light guide plate to be within the range of 75° to 80°, thereby to improve the light utilization.

As shown in FIG. 10, the present disclosure further provides in some embodiments a light guide plate manufactured using the above-mentioned die core. The light guide plate includes a body 6 and dots 600 arranged at a reflection surface of the body 6. The dots 600 include protrusions 6001 and recesses 6002, and a height of each protrusion 6001 is smaller than a depth of each recess 6002.

According to the light guide plate in the embodiments of the present disclosure, e each recess 6002 of the light guide plate has a larger depth, and each protrusion 6001 of the light guide plate has a smaller height, i.e., the height of each protrusion 6001 is smaller than the depth of each recess 6002. At this time, the angle θ2 between the plane tangent to the outer wall of the recess 6002 and the plane parallel to the reflection surface of the light guide plate may increase. In the case that the angle θ2 increases, it is able to increase a scattering angle of the dots 600 of the light guide plate, improve a convergence property, enable the recess 6002 to guide the light beam to exit from a light-exiting surface of the light guide plate in a better manner, and reduce the possibility of total reflection of the light beam at the light-exiting surface, thereby to improve the light utilization. In addition, in the case that the scattering angle of the dot of the light guide plate increase, it is also able for the light beam entering the dot to exit from the light guide plate in a direction substantially perpendicular to the light-exiting surface of the light guide plate, thereby to increase the light energy of the light beam from the light guide plate.

The height of each protrusion 6001 of the light guide plate corresponds to the depth of the recess 3002 of the die core, the depth of each recess 6002 of the light guide plate corresponds to the height of the protrusion 3001 of the die core, and the depth of the recess 3002 and the height of the protrusion 3001 may be adjusted through adjusting the thickness of the coverage layer 42. Hence, the height of each protrusion 6001 and the depth of each recess 6002 of the light guide plate may be set in accordance with the practical need.

In a possible embodiment of the present disclosure, each protrusion 6001 of the light guide plate has a height within the range of 1.5 μm to 2.0 μm, each recess 6002 of the light guide plate has a depth within the range of 1.8 μm to 2.2 μm, and the angle θ2 between the plane tangent to the outer wall of the recess 6002 and the plane parallel to the reflection surface of the light guide plate may be within the range of 75° to 80°. In this way, it is able to improve the light utilization in a better manner.

In the above description, the features, structures and materials may be combined in an appropriate manner in any embodiment(s).

The above are merely the preferred embodiments of the present disclosure, but the present disclosure is not limited thereto. Obviously, a person skilled in the art may make further modifications and improvements without departing from the spirit of the present disclosure, and these modifications and improvements shall also fall within the scope of the present disclosure.

What is claimed is:

1. A method for manufacturing a die core for a light guide plate, comprising steps of:
   providing a body, a surface of the body comprising a dot formation region and a dot-free region;
   forming a sacrificial layer covering the surface;
   forming dots at the dot formation region and removing the sacrificial layer on the dot formation region simultaneously, the dots comprising protrusions and recesses; and
   forming a coverage layer at least covering the protrusions.

2. The method according to claim 1, wherein the step of forming the coverage layer at least covering the protrusions comprises forming the coverage layer covering all the dots.

3. The method according to claim 1, wherein
   the step of forming the coverage layer at least covering the protrusions comprises forming the coverage layer at least covering the protrusions through an electroplating process; and
   subsequent to the step of forming the coverage layer at least covering the protrusions, the method further comprises removing the sacrificial layer at the dot-free region.

4. The method according to claim 3, wherein the step of forming the coverage layer at least covering the protrusions through an electroplating process comprises:
   placing the body with the dots and an electroplating target into a tank containing an electroplating liquid;

enabling the body to be connected to a negative pole of a direct current source, enabling the electroplating target to be connected to a positive pole of the direct current source, and applying an electric signal to the body and the electroplating target through the direct current source; and enabling metal cations in the electroplating liquid to be deposited onto the dots on the body under the effect of the electric signal to form the coverage layer at least covering the protrusions.

5. The method according to claim 2, wherein the step of forming the coverage layer at least covering the protrusions comprises forming the coverage layer at least covering the protrusions through an electroplating process; and subsequent to the step of forming the coverage layer at least covering the protrusions, the method further comprises removing the sacrificial layer at the dot-free region.

6. The method according to claim 1, wherein the coverage layer has a thickness of 1 μm to 3 μm;

a depth of each recess is within a range of 1.5 μm to 2.0 μm;

a height of each protrusion is within a range of 1.8 μm to 2.2 μm; and a plane tangent to an outer wall of the coverage layer covering the protrusions is angled relative to a plane parallel to the surface at an angle of 75° to 80°.

7. The method according to claim 6, wherein the coverage layer covers the dot formation region;

a vertical distance between a top of the coverage layer on each protrusion and the surface of the body is within a range of 1.8 μm to 2.2 μm; and a vertical distance between a bottom of the coverage layer on each recess and the surface of the body is within a range of 1.5 μm to 2.0 μm.

* * * * *